Sept. 6, 1949.   T. A. MARCINIK   2,481,321
VISIBLE HEADLIGHT INDICATOR AND GUIDE
Filed Feb. 13, 1947
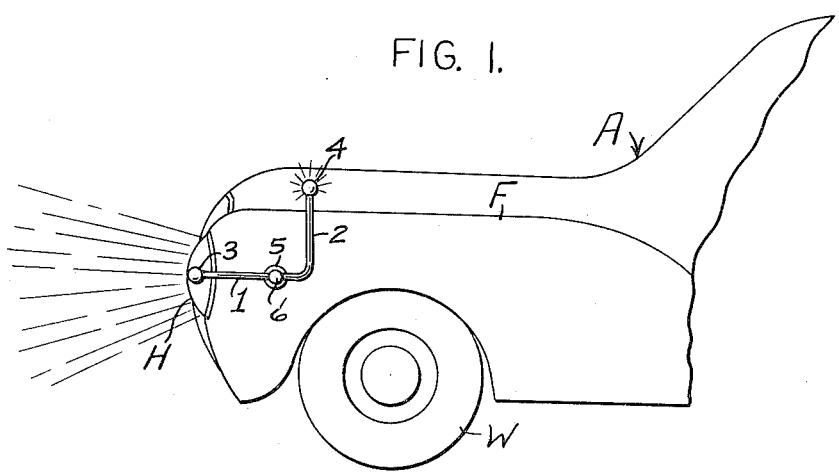
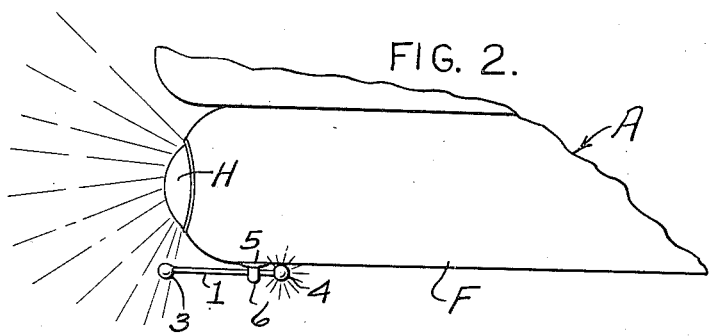
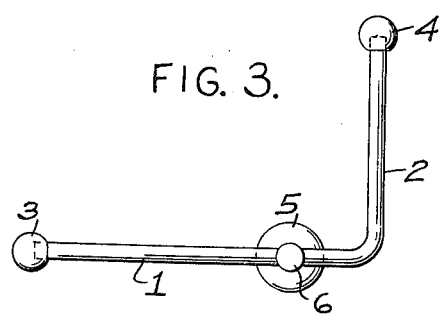
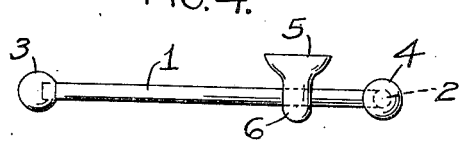
INVENTOR.
THEODORE A. MARCINIK
BY Victor J. Evans & Co.
ATTORNEYS Patented Sept. 6, 1949

2,481,321

UNITED STATES PATENT OFFICE 2,481,321

VISIBLE HEADLIGHT INDICATOR AND GUIDE

Theodore A. Marcinik, Latrobe, Pa.

Application February 13, 1947, Serial No. 728,347

2 Claims. (Cl. 116—28)

My present invention relates to automotive vehicle lighting in the general class of illumination, and more specifically to an improved visible headlight indicator and guide of the type which is combined with a front fender of the vehicle and supported thereon by means of a suction cup, in close proximity to a headlight of the vehicle.

The primary object of the invention is the provision of a device of this character that is composed of a minimum number of parts that may with facility be manufactured at low cost of production and assembled with convenience for installation upon the front fender, or other suitable support, of an automotive vehicle and in correct relation to an illuminated headlight for transmission of light from the headlight to a visible signal for the driver of the automotive vehicle.

In addition to providing a signal which indicates that a headlight is properly illuminated, the device of my invention also performs the functions of a guide that shows the overall width of the vehicle to which the device is attached; and while I have illustrated the indicator located at one side of a vehicle, it will be understood that the devices may be mounted in combination with the usual pair of headlights at the opposite sides of the vehicle.

The invention consists in certain novel features of construction and combinations and arrangements of parts involving a visible signal, indicator, or guide associated with an illuminated lamp, which is adapted to receive, transmit, and radiate light from the illuminated lamp for the purpose as described, as will hereinafter be specified, and particularly set forth in my appended claims.

In the accompanying drawings I have illustrated one complete example of a physical embodiment of my invention wherein the parts are combined and arranged with a headlight for an automobile according to one mode I have devised for the practical application of the principles of my invention. It will, however be understood that changes and alterations are contemplated and may be made in these exemplifying drawings and mechanical structures, within the scope of my claims, without departing from the principles of my invention.

Figure 1 is a view in side elevation at the left front side of an automotive vehicle showing an installation of the device of my invention.

Figure 2 is a top plan view of the structures in Fig. 1.

Figure 3 is an enlarged detail view in side elevation of the visible indicator and guide of my invention; and Figure 4 is a top plan view of the device in Fig. 3.

In order that the general relation of parts may readily be understood I have indicated in the drawings so much of an automotive vehicle as is necessary to illustrate the utility of my invention, and in Figs. 1 and 2 a portion of an automobile is indicated as A with the left front wheel W, the left front fender F, and a conventional headlight as H.

In the preferred form of my invention I employ an integral angular bar or rod having a horizontal section or arm 1 and an upright or vertical section or arm 2, at the ends of which are located heads, here shown as spherical bulbs or balls, of which the head 3 is utilized as a light receiving bulb and the head 4 is employed as a distributing, emitting, or light radiating bulb.

The bar and bulbs are constructed of plastic material which is molded, pressed, or fashioned in other suitable manner to provide a structure that is capable of receiving and absorbing light from the headlight H, transmitting the light to the upper bulb, and the latter bulb is made luminous, or glows, as it emits or radiates the transmitted light from the headlight.

As indicated in the drawings the angular bar or L-shaped bracket is mounted in correct relation to the headlight so that the bulb 3 receives light from the headlight, and in order that the luminous or glowing bulb 4 is readily visible from the driver's seat of the automobile. The luminous bulb indicates that the headlight is illumined, and it also acts as a guide for the driver of the car in gauging or measuring the lateral projection of the front portion of the left side of the car.

The visible guide or signal may be mounted for use upon various types of automotive vehicles, and as here shown the smooth exterior surface of a car fender, as F, is utilized for supporting the device in correct relation to the headlight, and where the luminous bulb is readily visible from the driver's seat of the vehicle.

One example as a supporting means for the visible signal and guide, is illustrated in the drawings as a suction cup 5, of rubber or other suitable material, which is fashioned with a perforated head 6 through which the horizontal section 1 of the rod extends, and the head 6 is of suitable size and shape to provide a substantial, durable and effective support for maintaining the device in correct position with relation to the headlight, and the driver's seat of the vehicle.

The suction cup may readily be applied to the smooth surface of the fender F, or other desirable supporting structure, and the suction cup and head possess the required rigidity for maintaining the device permanently in proper position, and holding the device against wabbling movement. If necessary or desirable, the device may be detached by releasing the suction cup, and with equal facility the cup or holder for the device may again be replaced in proper position for use.

Having thus fully described my invention, what I claim as new and desire to secure by Letters Patent is:

1. A motor vehicle indicator comprising an L-shaped bracket having a horizontally disposed forwardly extended arm and a vertically disposed arm positioned on the rear end of said horizontally disposed arm, said bracket formed of material adapted to transmit light, and means mounting the bracket on the outer side surface of a front fender of a motor vehicle with the arms spaced from the outer surface of the fender providing a guide for the fender and with the forward end of the horizontally disposed arm positioned slightly ahead of the lens of the headlight of the vehicle and in the path of rays of light of the headlight, said headlight being positioned in said fender and said bracket positioned with the upper end of the vertically disposed arm positioned above the upper surface of the fender.

2. A motor vehicle guide comprising an L-shaped bracket of light transmitting material having a horizontally disposed forwardly extending arm and a vertically disposed arm positioned on the rear end of said horizontally disposed arm, said arms having balls of said light transmitting material on the ends thereof, and means mounting the bracket on the outer side surface of the front fender of a motor vehicle with the arms spaced from the surface of the fender providing a guide for the fender and with the forward end of the horizontally disposed arm positioned slightly ahead of the lens of a headlight of the motor vehicle and with the ball on the end thereof in the path of rays of light of the headlight, said headlight being positioned in said fender, and said bracket positioned with the upper end of the vertically disposed arm above the upper surface of the fender whereby the operator of the vehicle may determine the extreme limit of the outer surface of the fender.

THEODORE A. MARCINIK.

REFERENCES CITED

The following references are of record in the file of this patent:

UNITED STATES PATENTS

| Number | Name | Date |
|---|---|---|
| 1,457,426 | Cameron | June 5, 1923 |
| 1,462,065 | Lee | July 17, 1923 |
| 2,060,771 | Kempf | Nov. 10, 1936 |
| 2,239,422 | Hayashi | Apr. 22, 1941 |